Patented Oct. 5, 1954

2,690,977

UNITED STATES PATENT OFFICE 2,690,977

ASPHALT BLEND

Everett C. Hughes, Shaker Heights, Harley F. Hardman, Wickliffe, John D. Bartleson, Cleveland, and Margaret L. Sunday, Cleveland Heights, Ohio, assignors to The Standard Oil Company, Cleveland, Ohio, a corporation of Ohio No Drawing. Application December 3, 1949, Serial No. 131,052

4 Claims. (Cl. 106—273)

This invention relates to an asphalt blend comprising a major proportion of an asphalt cement and a minor amount of an additive prepared by reacting phosphorus pentasulfide with an olefin, and then reacting the reaction product with steam.

Asphalt is used extensively as a binder for stone aggregate, such as in the surfacing of roads. An important requirement of asphalt is its adhesion to the aggregate, especially in the presence of water. The significance of this property can be evaluated from a consideration of the following typical tests.

Ohio State Department of Highways Supplemental Specification Test M–205.1

100 grams of standard reference stone composed of 50 percent silica gravel and 50 percent crushed limestone, graded to pass a ⅜″ sieve and be retained on a ¼″ sieve, is dried one-half hour at 275° F. and coated with 5 gms. of asphalt by mixing with a spatula for 3 minutes. The mixture is spread thinly on a plate and allowed to cure at a laboratory temperature for 1 hour. The mixture is then immersed in distilled water at 180° F. for one-half hour, after which the number of particles showing stripping is determined.

This test is referred to hereinafter as the Ohio test, and in order to pass the test the material must show a coating of at least 95%; i. e., a stripping of not over 5% of the aggregate particles.

Missouri Boil Test

Coating of the aggregate is carried out exactly as for the Ohio M–205.1 Test and the same aggregate is used. After curing 1 hour at laboratory temperature, the mixture is immersed in hot distilled water, brought to a vigorous boil and boiled for 1 minute, and then examined for stripping.

Modified Wash Test

The same aggregate is used as in the Ohio M–205.1 Test, as well as the same coating procedure. After curing at room temperature for 1 hour, the mixture is immersed in distilled water at room temperature and shaken vigorously for 15 minutes, and then examined for stripping. If no stripping occurs, the temperature is increased to 100° F. and shaking for 15 minutes repeated. The procedure is repeated, increasing the temperature by 20° F. intervals until appreciable stripping occurs.

30-Minute Boil Test

This is the same as the above Ohio Test, except that the water is maintained at boiling temperature for 30 minutes, instead of at 180° F.

Immersion-Compression Test

The ⅜″–¼″ standard limestone and silica aggregates specified for the Ohio M–205.1 Test are crushed to the following screen analyses (U. S. Sieve Series):

|  | Limestone, Percent | Silica, Percent |
|---|---|---|
| On 2.5 mesh | 0.0 | 0.0 |
| On 4 mesh | 7.0 | 7.3 |
| On 6 mesh | 24.0 | 32.0 |
| On 80 mesh | 55.7 | 57.5 |
| On 200 mesh | 4.5 | 2.5 |
| Through 200 mesh | 7.0 | 0.8 |

These aggregates are then made up into cylindrical specimens containing 5 percent by weight of asphalt in accordance with the method being considered as a tentative standard by Sub-committee B-22 of Committee D-4 of A. S. T. M. Half the specimens are tested for compression strength immediately and the other half after 4 days immersion in water at 120° F. Results are expressed as percent loss in compression strength based on the unsoaked specimens.

Another important property of an asphalt is its resistance to oxidative deterioration. The following tests are suitable for determining this property:

Air Blown Oxidation Test—400° F.

150 gm. samples of the various asphalts are blown at 400° F. with 0.04 ft.³/min. of air for 135 minutes in the Sohio lubricating oil oxidation test procedure (described in U. S. Pat. 2,403,894). Penetrations, ductilities, and softening points of the oxidized asphalts are then determined.

Thin Film Oven Test

Reference is made to R. H. Lewis and J. Y. Welbron, Proc. Assoc. Asphalt Paving Technologists 12, 14. (Dec. 1940). For this test 50 ml. of asphalt is weighed into a flat bottom container 5.5″ I. D. so as to obtain a film thickness of ⅛″. Other than the container size the conditions are those of the A. S. T. M. test D6—39T for loss on heating (5 hours at 325° F.). Penetrations, ductilities, and softening points are determined on the residue.

Shell Oxidation Test

Reference is made to Ind. Eng. Chem. Anal. Ed. 14, 45 (1942). The procedure differs from that originally described only in that the bomb used is that for the A. S. T. M. Oxidation Stability of Gasoline, Designation D525—46. 100 gm. of asphalt are dissolved in 67 gm. of benzene, placed in the bomb under 100 p. s. i. g. of oxygen, the bomb then inserted into a water bath at 120° F., and the pressure recorded as a function of time. The asphalt is then recovered from solution and its penetration measured. The Oxidation Rating is the product of the pressure drop at 40 hours and the slope of the tangent at 40 hours on the curve of pressure drop versus time. The larger the Oxidation Rating the more oxygen has been consumed. To obtain the Hardening Rating, the curve of log penetration versus pressure drop for 3 or more samples is extrapolated to obtain the pressure drop necessary to reach 20 penetration (A. S. T. M. units). The larger the Hardening Rate the more oxygen will be required for a given reduction in penetration. The Deterioration Index is obtained by (Oxidation Rating/Hardening Rating) ×100, and smaller values indicate better oxidation resistance.

*Sohio Test Method A-2—1146T*

Reference is made to Ebberts, Ind. Eng. Chem. 34, 1408 (1942). This test involves determining the number of milliliters of 0.1 normal $KMnO_4$ solution consumed by a standard film of the asphalt during 1 hour at 140° F. Some correlation with service performance of asphalts has been reported. The smaller the quantity of $KMnO_4$ consumed, the more resistant to oxidation the asphalt is said to be.

Many commercially available asphalts require an additive for improving their adhesion in order to meet the Ohio Test requirements. The requirement of the additive necessarily increases the cost of the asphalt, and from the economic viewpoint, an important problem is to find an additive which is of relatively low cost, or will produce the desired improved adhesion when a much lower concentration of the additive is used, or both.

It has been found, in accordance with the invention, that an economically desirable additive may be prepared by reacting a low cost olefin with phosphorus pentasulfide and then reacting with steam.

The objects achieved in accordance with the invention include the provision of an economically advantageous additive for use in asphalts, and its preparation by reacting an olefin with phosphorus pentasulfide, and then reacting with steam; the provision of economic asphalts of highest quality, and their preparation by incorporating into a lower quality asphalt an amount to bring the adhesion of the cement up to the desired quality standard; of a reaction product prepared by reacting an olefin with phosphorus pentasulfide, and then reacting with steam; and other objects which will be apparent as details or embodiments of the invention are set forth hereinafter.

The additive can be used with any asphaltic composition, but finds particular application in asphalt cement, which as referred to herein, is asphalt without added material, as is well understood in the art, and is to be distinguished from a solution of asphalt in a solvent or an emulsion with water.

In general, olefins used in preparing the additive have from about 4 to about 25 carbon atoms in the molecule and these are preferred as an initial reaction component. A commercially desirable olefin is so-called "motor polymer" or species of this known as "heavy motor polymer" or "reduced motor polymer." "Motor polymer," as this term is used, is an olefin polymer made from $C_3$ and $C_4$ olefins by polymerization, e. g., with a phosphorus acid type catalyst. It is a slightly fluorescent, light colored liquid. In its whole state it has an F-2 clear octane rating in the range of 75-85, and a typical motor gasoline boiling point range with the bulk of the products boiling off at between about 190° and 360° F., thus indicating that the bulk of the material is in the $C_8$-$C_{10}$ olefin boiling range with some lighter and heavier ends. The polymers appear, in general, to be fairly highly branched and contain substantial proportions of tertiary olefins. Little or no diolefins are present and it contains virtually no aromatic, naphthenic or paraffinic constituents. This is well known in the industry as "motor polymer" and need not be further defined to be fully understood by one skilled in the art.

A polymer gasoline fraction may be removed from such a "motor polymer" by fractional distillation to the 250° F. cut point, and the residue (I. B. P. of 250° F.) is known as "reduced motor polymer." The "reduced motor polymer" may contain small amounts of materials lighter than trimer, its average molecular weight is about 145, and it preferably contains a major amount of olefins boiling below 600° F. Other fractions having other initial boiling points (I. B. P.) are referred to as "heavy motor polymer" and are identified by their I. B. P. Olefins and olefin polymers made from other olefins and by other methods may be used.

The sulfide-olefin reaction may be carried out in the presence or absence of air, or in an atmosphere of inert or non-deleterious gas, such as nitrogen or $H_2S$. It may also be carried out at atmospheric pressure or under superatmospheric pressure, e. g., the pressure generated when the reaction is carried out in a closed vessel or the pressure due to an added inert gas.

Water within the range of 0 to 10% may be present, preferably about 3 to 6%, if water is employed. The yield is very high. Generally, the amount of phosphorus pentasulfide is chosen so that all of it will react at the temperature selected and the reaction is continued until it is consumed. In general, about 0.25 to 0.75 mol of phosphorus pentasulfide are used per mol of olefin. The preferred ratio is about 0.5:1.0. The temperature for the reaction is selected so that it proceeds at such a rate as to complete the reaction in a reasonable time. Generally, the temperature is within the range of 150° to 425° F., the lower temperatures requiring much longer reaction times. The preferred temperature range is 230° to 350° F.

The phosphorus pentasulfide-olefin reaction product may be made with direct admixture of the reactants, or, if desired, by their admixture in the presence of a diluent which may or may not be subsequently removed.

The reaction is usually complete in about 10 hours or less time, except in the case of temperatures in the lower part of the range. The reaction time is a function of the temperature, the pressure, the amount of the phosphorus pentasulfide that is to react, the subdivision of the reactants, the rate of stirring, etc.

After the reaction is complete, the reaction product may be reacted with steam directly. However, if desired, it may be centrifuged or filtered to remove any insoluble by-product substances if these are formed, before it is reacted with the steam.

The reaction with steam is preferably carried out at a temperature within the range of 212° to 300° F., preferably 215° to 260° F., and is continued until the desired product is obtained, generally from ½ to 48 hours depending on the rate of reaction with steam and the amount of available steam. This step alters the chemical composition of the product. The reaction with steam is believed to be one of hydrolysis in which oxygen replaced sulfur with the elimination of sulfur as $H_2S$. It is carried out conveniently by passing steam through the initial reaction product at an elevated temperature.

It will be noted that there are a number of variables in making the initial reaction product which are defined as covering relatively wide ranges. While variations within these ranges result in additives of somewhat different properties, they are all effective for improving the adherence of asphalt and none of the variables are critical in this regard.

When the olefin-sulfide reaction product is prepared there may be some sludge or lower layer formation, depending on the reaction conditions. This may be separated as indicated earlier. It is usually desirable not to form a sludge, in order to obtain a 100% yield and in order that the separation step may be avoided. However, as explained above, the sludge need not be separated before the steam reaction.

The extent of the reaction with steam is such, that when ½% of the additive is added to an asphalt from a Mid-Continent crude, it will pass the Ohio 95% adherence test. This is not meant to exclude such an amount of the steam reaction as to produce an additive which is similarly effective in higher and lower amounts, i. e., as long as ½% is effective, it is included in the invention even though lower and higher amounts are also similarly effective. The steam reaction increases the pentane insolubles, but the exact amount of the steam reaction to make the additive effective as described, varies with the exact character of the reaction product to be so treated. In general, as revealed by many tests too numerous to include here, the amount of pentane insolubles in the additive to provide good anti-stripping properties is about at least 30%. The steam reaction also increases the neutralization number and in this property also the extent of the increase to obtain an effectiveness of the type described varies. In general, and as revealed by numerous tests, the neutralization number should be about at least 100. In the steam reaction step there may be instances in which two or more layers form. In such cases the layer is selected which has the desired properties, or if the mixture of layers has the desired properties, the mixture of the layers may be used. It is usually desirable to avoid layer formation in the steam reaction in order that the product may be uniform and homogeneous.

From the above discussion it will be apparent that there are at least three general methods of preparation, each having its particular advantages or disadvantages depending upon the operating equipment and procedures available.

1. Phosphorus pentasulfide and the olefin are reacted under pressure with or without water. In this reaction a sludge is generally formed, especially when water is present, and the subsequent reaction with steam goes with ease, and there is no difficulty in obtaining a final uniform product with the desired properties.

2. Phosphorus pentasulfide and the olefin are reacted at atmospheric pressure. No sludge is formed at the optimum temperature range. The subsequent steam reaction may be very rapid and the short reaction time with steam may be an advantage. If the steam reaction is stopped at the right point, only one layer is obtained having the desired properties.

3. Phosphorus pentasulfide and the olefin may be reacted at atmospheric pressure without sludge formation at the optimum temperature range. If the rate of steam reaction or steam introduction is slow, the process is more easily controlled than in the second process. However, two layers are generally formed, and the lower layer usually has the higher neutralization number. However, as explained above, the mixture of the two layers may be used and in most cases since the lower layer contains a very large amount of pentane insolubles and a high neutralization number, the average of the two layers meets the requirements even though the upper layer alone may not.

The above discussion of the steps of the various processes and the results will be better understood from a consideration of the following examples:

Example A

In a typical reaction of the olefin and the sulfide, 60 pounds of "reduced motor polymer," 38% of phosphorus pentasulfide and 2.4 pounds of water were mixed and heated in a closed vessel. The temperature reached 350° F. in one hour, and it was maintained at this temperature for three hours, with agitation. The reaction mass was then filtered hot from a sludge amounting to about 10%. The resulting product had the following properties:

3.9 weight percent pentane insolubles, a viscosity at 100° F. of 167 cs. (centistokes), 25.2% sulfur, 8.4% phosphorus, a molecular weight of 333, a neutralization number of 45, a saponification number of 212, and a density of 1.0505, and an optical density of 321.

This was tested by the Ohio Test in an asphalt from Mid-Continent crude and with the addition of 1½%, the asphalt showed 98% coating. An amount between 1 and 1½% gave the required 95% coating.

Example 1

A portion of the above $P_2S_5$ "motor polymer" reaction product from Example A was reacted with steam at a temperature of 230° F., for two hours. The residue was 70.6 weight percent of the charge. This residue had the following characteristics:

32.2 weight percent pentane insolubles, a viscosity at 100° F. of 5,370 cs. or 24,800 SUS, 21.0 weight percent sulfur, 11.9 weight percent phosphorus, a neutralization number of 147, and a density of 1.1112.

This reaction product was incorporated in the above asphalt, in an amount of 0.25 weight percent of the asphalt, and then subjected to the Ohio Test. This showed a 96% coating, which is clearly within the Ohio Test requirement.

Example 2

In a similar reaction with steam of Example A, conducted for 4 hours, 68.2 weight percent of residue was obtained, having 31.0 weight percent pentane insolubles, 20.8 weight percent sulfur, and 11.6 weight percent phosphorus, and a neutralization number of 125. This product also gave a 96% coating result, Ohio Test method, when 0.25 weight percent thereof was incorporated in the above asphalt.

*Example 3*

Another portion of the above $P_2S_5$ "motor polymer" reaction product of Example A was reacted with steam at a temperature of 230° F. for one hour. The residue was 75.2 weight percent of the charge. It had the following characteristics:

30.5 weight percent pentane insolubles, a viscosity at 100° F. of 6,170 cs. or 28,500 SUS, and a neutralization number of 150. This product also gave a blend which tested 96% coating, Ohio Test method, when 0.25 weight percent was incorporated in the above asphalt.

It will be noticed in the above examples that the pentane insolubles and neutralization number have substantially increased. It will also be noticed that a much smaller amount of the steam reacted product passes the test thus indicating the improvement imparted by the steam reaction.

*Example 4*

A portion of the above $P_2S_5$ "motor polymer" of Example A was treated with clay, i. e. 197 parts by weight of clay was mixed with 3.750 parts by weight of the reaction product, at a temperature of 250° F. for 30 minutes, and then filtered. The filtrate was used in this example. It was reacted with steam at a temperature of 230° F. for 3 hours. The residue was 78.2 weight percent of the charge. The sole purpose of clay treatment is to improve color and the treatment does not otherwise affect the results. It is used in the following tests because its better color was thought to make it a more marketable product. The residue had the following characteristics:

30.9 weight percent pentane insolubles, a viscosity at 100° F. of 5,001 cs., 21.0 weight percent sulfur, 13.1 weight percent phosphorus, and molecular weight of 510, a neutralization number of 132, a saponification number of 219, and a density of 1.1134.

This reaction product also gave a blend which tested 96% coating, Ohio Test method, when 0.25 weight percent thereof was incorporated in the above asphalt.

The following data indicate typical test results of the several additives using a 70/80 penetration asphalt from a Mid-Continent crude when tested by the Ohio Test:

TABLE I

| Additive of Example No. | Amount, Percent | Percent Ohio Test Results |
| --- | --- | --- |
| A | 1.50 | 98 |
| 1 | 0.25 | 96 |
| 2 | 0.25 | 96 |
| 3 | 0.25 | 96 |
| 4 | 0.50 | 100 |
| 4 | 0.375 | 97 |
| 4 | 0.25 | 96 |
| 4 | 0.20 | 94 |

The additives of the invention in the above asphalt (70/80 Pen.) were tested by the 30-minute boil test. The following results, obtained with the Example 4 material, are typical.

TABLE II

| Additive of Example No. | Conc., Percent | Percent Aggregate Coated 30 Min. Boil Test |
| --- | --- | --- |
| 4 | 0.50 | 100 |
| 4 | 0.40 | 85 |
| 4 | 0.375 | 80 |

This data clearly shows that the additive of the invention is effective in the 30-minute boil test when used in a relatively small amount.

Comparable results are obtained with any of the suitable steam reacted products already mentioned.

The following different tests also indicate advantages of the additive of the invention using a petroleum 70/80 Pen. asphalt (Mid-Continent crude) the values indicate the percent of the number of particles (Ohio Test aggregate) which show stripping.

TABLE III

| Additive of Example No. | Amount, Percent | Ohio M-205.1, Percent Stripped | Missouri Boil, Percent Stripped | Modified Wash Test | | 30-Min. Boil, Percent Stripped |
| --- | --- | --- | --- | --- | --- | --- |
| | | | | Percent Stripped | Temp., degrees | |
| None | | 80 | 50 | 20 | 77 | |
| 4 | 0.5 | 0 | 3 | 2 | 180 | 0 |

The following different tests also indicate advantages of the additive of the invention using a petroleum 70/80 Pen. asphalt from a Mississippi crude; the values indicate the percent of the number of particles which show stripping.

TABLE IV

| Additive of Example No. | Amount, Percent | Ohio M-205.1, Percent Stripped | Missouri Boil, Percent Stripped | Modified Wash Test | |
| --- | --- | --- | --- | --- | --- |
| | | | | Percent Stripped | Temp., degrees |
| None | | 65 | 25 | 15 | 77 |
| 4 | 0.5 | 0 | 1 | 2 | 180 |

The 70/80 Pen. asphalt from a Mid-Continent crude, and a blend thereof containing the additive were subjected to the Immersion-Compression Test and the following results are typical:

TABLE V

| Additive of Example No. | Amount, Percent | Limestone | | Silica | |
| --- | --- | --- | --- | --- | --- |
| | | Percent Voids in Specimen | Percent Loss in Comp. Strength | Percent Voids in Specimen | Percent Loss in Comp. Strength |
| None | | 16.8 | 42.9 | 18.9 | 9.5 |
| 4 | 0.5 | 15.6 | 39.0 | 18.6 | 5.1 |

Table V indicates that 0.5% of the additive of the invention is superior to the asphalt without the additive.

A 70/80 Pen. petroleum asphalt (Mississippi crude) and a blend thereof containing 0.5% of the additive, were subjected to oxidation tests, and the following results are typical:

TABLE VI

| Additive | None | Ex. 4 |
|---|---|---|
| Air Blown Oxidation—400° F.: | | |
| Pen. 77°—100 G.—5 sec | 44 | 51 |
| Duct. 77°—5 cm./min | 65 | 100+ |
| 60°—5 cm./min | 7.5 | 10 |
| R. & B. Soft. Point, ° F | 140 | 134.5 |
| Original Properties of Asphalts: | | |
| Pen. 77°—100 gm.—5 sec | 72 | 71 |
| Duct. 77°—5 cm./min | 100+ | 100+ |
| 60°—5 cm./min | 38 | 54 |
| R. & B. Soft. Point, ° F | 126 | 119 |

The penetration and ductilities of the oxidized treated asphalt are higher than those of the untreated asphalt indicating that the additive has anti-oxidant properties.

A 70/80 Pen. petroleum asphalt (Mid-Continent crude), and a blend thereof containing 0.5% of the additive were also subjected to the other oxidation tests, and the following results are typical:

TABLE VII

| Additive | Sohio A-2-1146T cc. 0.1 N KMnO$_4$ | Hardening Rating | Oxidation Rating | Deterioration Index |
|---|---|---|---|---|
| None | 2.27 | 160 | 42.5 | 26.6 |
| Ex. 4 | 1.71 | 147 | 36.1 | 24.6 |

Table VII shows that the additive of the invention has an anti-oxidant effect upon asphalt.

The independence of the penetration characteristic of the asphalt, upon its adhesion characteristic when using the additive of the invention is indicated in the following Ohio Test data, using an asphalt from a Mid-Continent crude:

TABLE VIII

| Penetration of Asphalt | Ohio Test, Percent Coated | |
|---|---|---|
| | None | 0.5%, Ex. 4 |
| 20 Pen | 95 | 100 |
| 63 Pen | 65 | 100 |
| 115 Pen | 65 | 100 |
| 200 Pen | 82 | 100 |

The effect of the additives of the invention in improving the adhesion property of commercial asphalts from various sources is indicated in the following Ohio Test data; the values being weight percent of the additive required for 100% coating:

TABLE IX

| Asphalt | Percent Coated, No Additive | Percent Add. of Ex. 4 for 100% Coating |
|---|---|---|
| California | 25 | 0.5 |
| Illinois Cracked | 100 | |
| Illinois | 94 | 0.05 |
| Low Ductility | 80 | 0.1 |
| Kansas Cracked | 82 | 0.25 |
| Smackover | 87 | 0.05 |
| Texas | 45 | 0.1 |
| Venezuelan | 85 | 0.5 |
| Kansas | 70 | 0.1 |
| California (high sulfur) | 70 | 0.1 |
| Trinidad | 70 | 0.1 |
| West Texas | 60 | 0.1 |
| Mexican | 25 | 0.1 |
| Wyoming | 95 | 0.05 |

This data indicates that the additive of the invention is an effective agent for improving the coating property of asphalts from a wide variety of sources.

The additive may be used in any amount that will result in the desired improvement. Generally the amount falls within the range of 0.01% to 1.0%, usually 0.1% to 0.5%.

The following examples are of interest in connection with the various methods of preparing the additive:

Example 5

One mol of $P_2S_5$, 2 mols of "reduced motor polymer" and 5% water were reacted at 325° F. for 2 hours at a pressure of about 100 pounds per square inch. The reaction product was separated from a sludge and was reacted with steam for 2 hours at 230° F. without difficulty. There was no layer formation. The steam reacted product had 31% pentane insolubles and a neutralization number of 135. One-quarter percent in an asphalt from Mid-Continent crude gave 96% coating by the Ohio Test.

Example 6

The above example was repeated except that whole "motor polymer" was used and the water was omitted. The steam reacted product formed one layer and had 68% pentane insolubles and a neutralization number of 250. One-quarter percent in an asphalt from a Mid-Continent crude gave 100% coating by the Ohio Test. In the example the higher pentane insolubles and neutralization number as compared with Example 5 gave a superior coating result.

Example 7

"Heavy motor polymer" (I. B. P. 212° F.) was reacted in the ratio of 62 parts by weight with 38 parts by weight of $P_2S_5$ over a period of 5 hours at a maximum temperature of 238° F. at atmospheric pressure. It was filtered from a 25% sludge showing that at this low temperature, even though no water is present, a sludge is formed. The reaction product had 29% pentane insolubles and a neutralization number of 62. When ½% is added to asphalt it coated 89% by the Ohio Test, failing the 95% requirement, and showing that the pentane insolubles and neutralization number are too low.

The reaction product was reacted with steam at 250° F. for 2 hours and had 95% pentane insolubles and a neutralization number of 204. When ½% is added to asphalt it coated 99% by the Ohio Test.

Example 8

64% "reduced motor polymer" (I. B. P. 260° F.) was reacted with 36% (by weight) of phosphorus pentasulfide for 1 hour at 240° F. after which the reaction was continued for an hour at 280° F. The reaction was carried out at atmospheric pressure in the absence of water and no sludge was formed.

The reaction product was reacted with steam for ½ hour at a temperature starting at 115° C. and reaching 132° C. The product had 28% pentane insolubles and a neutralization number of 95. Asphalt containing ¼% coated 87% by the Ohio Test showing the effect of the lower amount of pentane insolubles and the neutralization number.

When the steam reaction is carried out for 1 hour the product had 50.2% pentane insolubles and a neutralization number of 238. Asphalt containing ¼% passed the Ohio Test by coating 99%.

Example 9

When Example 8 was repeated except that the initial reaction was carried out for 2 hours at 325° F. and the steam reaction was carried out for ½ hour, the product had 100% pentane insolubles and a neutralization number of 580. Asphalt containing ¼% passed the Ohio Test by coating 99%. In this case there was also no sludge or layer formation. The higher initial reaction temperature permits a shorter steam reaction.

Example 10

When the above example is repeated except that the initial reaction is carried out at a temperature of 270 to 280° F. in the absence of water and at atmospheric pressure, there is no sludge formation. Upon the rapid introduction of steam, an exothermic reaction takes place making the reaction somewhat difficult to control and stop before two layers are formed. However, the short reaction time makes it possible to produce a product by a continuous process without sludge formation in the initial reaction, or without layer formation in the steam reaction. The product meets the requirements.

When the process is repeated except that steam is introduced at a slow rate at a temperature of 230° F., the steam reaction is relatively slow and two layers are formed. This permits a better control of the reaction, especially in a plant-scale batch operation. The lower layer was highly acidic (neutralization number of 399), and contained a large amount (96%) of pentane insolubles. A mixture of the two layers met the requirements, and the lower layer alone may be used or the two layers may be used as the additive.

It will be obvious that in view of the many variables entering into the process by which our product is made, there are many variations falling within our invention that are not included in the illustrative examples and we intended all of the same to be included as fall within the following claims.

We claim:

1. An asphalt blend comprising a major proportion of an asphalt cement and a minor amount within the range of 0.05 to 2.5% by weight of an additive prepared by reacting a liquid olefin with phosphorus pentasulfide in the proportions of about 0.25 to 0.75 mol of phosphorus pentasulfide per mol of olefin at a temperature within the range of 150 to 425° F. and then steam stripping the resultant reaction product to an extent to provide the residue with a pentane insolubles content of about at least 30% and a neutralization number of about at least 100.

2. An asphalt blend according to claim 1 in which the liquid olefin is a liquid olefin "motor polymer."

3. An asphalt blend comprising a major proportion of an asphalt cement and a minor amount within the range of 0.05 to 2.5% by weight of an additive prepared by reacting a liquid olefin with phosphorus pentasulfide in the proportions of about 0.5 mol of phosphorus pentasulfide per mol of olefin at a temperature within the range of 230° to 350° F. and then steam stripping the resultant reaction product to an extent to provide the residue with a pentane insolubles content of about at least 30% and a neutralization number of about at least 100.

4. An asphalt blend according to claim 3 in which the liquid olefin is a liquid olefin "motor polymer."

References Cited in the file of this patent

UNITED STATES PATENTS

| Number | Name | Date |
|---|---|---|
| 2,316,087 | Gaynor et al. | Apr. 6, 1943 |
| 2,316,090 | Kelso et al. | Apr. 6, 1943 |
| 2,424,402 | Loane | July 22, 1947 |
| 2,534,217 | Bartleson et al. | Dec. 19, 1950 |